United States Patent
Lee et al.

(10) Patent No.: US 8,873,119 B2
(45) Date of Patent: Oct. 28, 2014

(54) SYSTEM OF DISPLAYING DIGITAL HOLOGRAM BASED ON PROJECTION AND METHOD THEREOF

(71) Applicant: Electronics and Telecommunications Research Institute, Daejeon (KR)

(72) Inventors: Beom Ryeol Lee, Daejeon (KR); Wook Ho Son, Daejeon (KR); Seung Taik Oh, Daejeon (KR); Ho Yong Seo, Seoul (KR); Il Kwon Jeong, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 95 days.

(21) Appl. No.: 13/647,354

(22) Filed: Oct. 8, 2012

(65) Prior Publication Data
US 2013/0155476 A1    Jun. 20, 2013

(30) Foreign Application Priority Data
Dec. 20, 2011    (KR) .......................... 10-2011-0138041

(51) Int. Cl.
*G03H 1/08*    (2006.01)
*G02B 5/32*    (2006.01)

(52) U.S. Cl.
USPC .................................. 359/9; 359/15; 359/21

(58) Field of Classification Search
CPC .......... G03H 1/08; G03H 1/2294; G03H 1/22
See application file for complete search history.

(56) References Cited

U.S. PATENT DOCUMENTS

| 8,395,833 | B2 * | 3/2013 | Schwerdtner et al. | ............. 359/9 |
| 2005/0286101 | A1 * | 12/2005 | Garner et al. | ..................... 359/9 |
| 2010/0014136 | A1 | 1/2010 | Haussler et al. | |
| 2010/0142016 | A1 | 6/2010 | Cable et al. | |
| 2011/0002020 | A1 * | 1/2011 | Khan | .............................. 359/22 |

FOREIGN PATENT DOCUMENTS

KR    10-2004-0076854 A    9/2004

OTHER PUBLICATIONS

Michael L. Huebschman et al., "Dynamic holographic 3-D image projection", Optics Express, Mar. 10, 2003, pp. 437-445, vol. 11, No. 5, OSA.
Wendy Plesniak et al., "Reconfigurable image projection holograms", Optical Engineering, Nov. 2006, pp. 115801-1~115801-15, vol. 45, No. 11, SPIE.

* cited by examiner

*Primary Examiner* — Jade R Chwasz

(57) ABSTRACT

A system and a method perform buoyance of a 3D hologram image on a hologram display screen in a projection mode. A system of displaying a digital hologram includes: a composite hologram unit configured to generate a hologram array by receiving hologram data of a fringe pattern and by compositing background image and a foreground image using the received fringe pattern; a hologram projection unit configured to project a hologram image through a wide-angle lens by applying a light to the hologram array; and a hologram display unit configured to perform space buoyance of the hologram image projected by the hologram projection unit on a 3D hologram display screen. The digital hologram content is managed in real time, and transmission of the digital hologram content to a remote place and site adaptive display of hologram image media may be achieved.

10 Claims, 2 Drawing Sheets

SYSTEM OF DISPLAYING DIGITAL HOLOGRAM BASED ON PROJECTION AND METHOD THEREOF

CROSS-REFERENCE TO RELATED APPLICATIONS

This application is based on and claims priority from Korean Patent Application No. 10-2011-0138041, filed on Dec. 20, 2011 with the Korean Intellectual Property Office, the disclosure of which is incorporated herein in its entirety by reference.

TECHNICAL FIELD

The present disclosure relates to a digital hologram, and particularly, to a system of displaying a digital hologram based on a projection which is used to visualize a generation result of the digital hologram based on a computer-generated hologram (CGH) and a method thereof

BACKGROUND

An analog-type hologram in the related art is a method in which an object wave in which light emitted from a laser is projected to the object and reflected to be incident in a hologram storage medium and a reference wave directly incident in the hologram storage medium interfere with each other to generate a fringe pattern and record the generated fringe pattern in the hologram storage medium.

In order to generate hologram by using a hologram information recorded as above, when the reference wave used during hologram recording is incident in the same direction to cause diffraction, the same hologram image as the object is reproduced at a position where the object is originally positioned.

When the hologram generated in an analog mode is generated once, the hologram cannot be changed, and as a result, a new hologram recording process is required whenever the object is changed, and there is a limit in resolution of the hologram image generated in an optical mode and a view volume view volume of an observer. Therefore, a hologram display requires a large capacity of spatial bandwidth in order to provide the size and a viewing angle of an existing display level.

Meanwhile, a calculation equation of a generation principle of the hologram fringe pattern by interference of the object wave for the object and the reference wave is processed through computer modeling when the digital hologram is generated.

In the digital hologram mode, the digital hologram may be regenerated through computer calculation in order to generate a new digital hologram image, and the size and viewing angle of the played hologram image may be improved by visualizing digital hologram data in not an optical hologram display mode but a projection mode.

SUMMARY

The present disclosure has been made in an effort to provide a system of displaying a digital hologram based on a projection by applying not an optical hologram display but a projection mode in order to visualize digital hologram data by space buoyance of the digital hologram data on a 3D display screen, and a method thereof The present disclose has also been made in an effort to provide a system of displaying a digital hologram based on a projection for space buoyance of a 3D hologram image for digital hologram data on a hologram display screen by configuring a composite hologram array for presenting a background image and a foreground image and using a projection mode, and a method thereof The present disclose has also been made in an effort to provide a method of managing a hologram content production process for producing a digital hologram content, and a system of displaying a digital hologram based on a projection for using a 3D hologram image as a display site adaptive local media information providing channel and a method thereof An exemplary embodiment of the present disclosure provides a system of displaying a digital hologram based on a projection includes: a composite hologram unit configured to generate a hologram array by receiving hologram data of a fringe pattern and by compositing the received fringe pattern, and a background image and a foreground image; a hologram projection unit configured to project a hologram image through a wide-angle lens by applying a light from a point light source to the hologram array generated from the composite hologram unit; and a hologram display unit configured to perform space buoyance of the hologram image projected by the hologram projection unit on a 3D hologram display screen.

According to exemplary embodiments of the present disclosure, digital hologram data is visualized by space buoyance of a hologram image on a 3D hologram display screen in a projection mode to display a 3D hologram image in an existing image display level, thereby improving reality of a hologram image.

A local situation recognition type hologram image is timely displayed through digital hologram content management to be used as a local information media display channel and a hologram content market can be extended by mass production and various utilizations of the digital hologram content through production process management of the digital hologram content.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

In the following detailed description, reference is made to the accompanying drawing, which form a part hereof The illustrative embodiments described in the detailed description, drawing, and claims are not meant to be limiting. Other embodiments may be utilized, and other changes may be made, without departing from the spirit or scope of the subject matter presented here.

Figure 1:
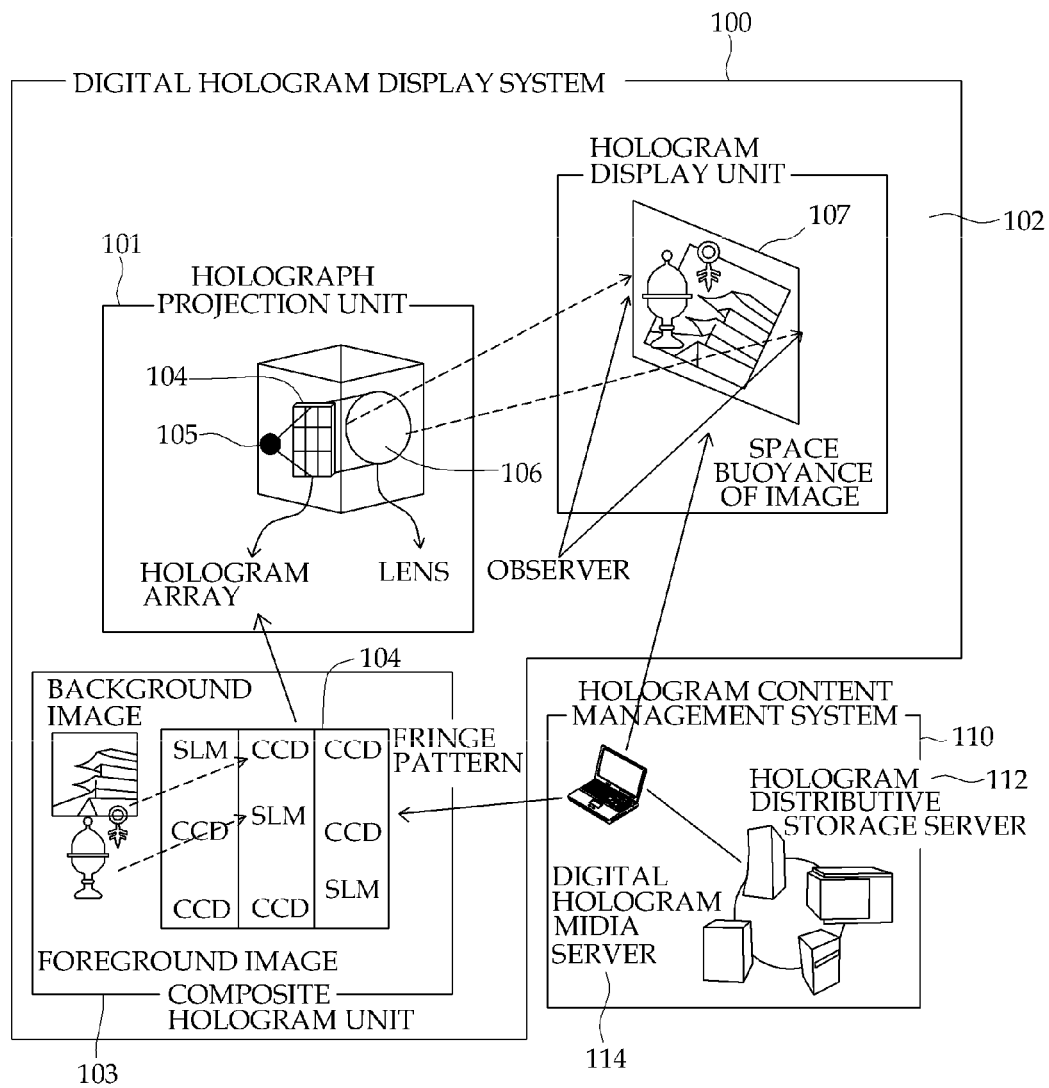
FIG. 1 is a block diagram illustrating a system of displaying a digital hologram based on a projection according to an exemplary embodiment of the present disclosure.

FIG. 1 is a diagram illustrating a system of displaying a digital hologram based on a projection according to an exemplary embodiment of the present disclosure. Referring to FIG. 1, the system according to the exemplary embodiment of the present disclosure may include a hologram projection unit 101, a hologram display unit 102, and a composite hologram unit 103.

In this case, a hologram content management system 110 applies digital hologram data to the composite hologram unit 103 of the digital hologram display system 100.

The composite hologram unit 103 performs space buoyance of the digital hologram data on a screen constituting the 3D hologram display unit 102 through the hologram projection unit 101. As such, in the present disclosure, a projection type digital hologram display system is provided.

More particularly, In the digital hologram display system 100, the composite hologram unit 103 receives hologram data of a fringe pattern. The composite hologram unit 103 generates a background image that is not changed and a foreground image that is changed in real time and composites the background image and the foreground image according to a received fringe pattern. Thus, the composite hologram unit 103 generates a composite hologram array 104 for increasing the size of a hologram image by arrangement of a charge coupled device (CCD) and a spatial light modulator (SLM) of a digital camera.

The hologram projection unit 101 irradiates light from a point light source 105 on a hologram array 104 and projects the irradiated light through a wide-angle lens 106.

The hologram display unit 102 performs space buoyance of the 3D hologram image projected to a 3D hologram display screen 107 using a spherical mirror. The hologram content management system 110 may include a hologram storage server 112. The hologram storage server 112 manages mass digital hologram data through a hologram storage server distributively storing the digital hologram data through a network system.

The hologram content management system 110 may include a digital hologram media server 114. The digital hologram media server (114) discriminates the hologram image data according to a local region environment. That is, the digital hologram media server 114 serves as an adaptive media channel suitable for a regional situation by converting the digital hologram content into hologram image information suitable for the local region environment, and transmitting and managing the converted hologram image information. Meanwhile, in order to manage a production process of the digital hologram data, a hologram production parameter is generated to preferably perform production and management of the hologram image.

Figure 2:
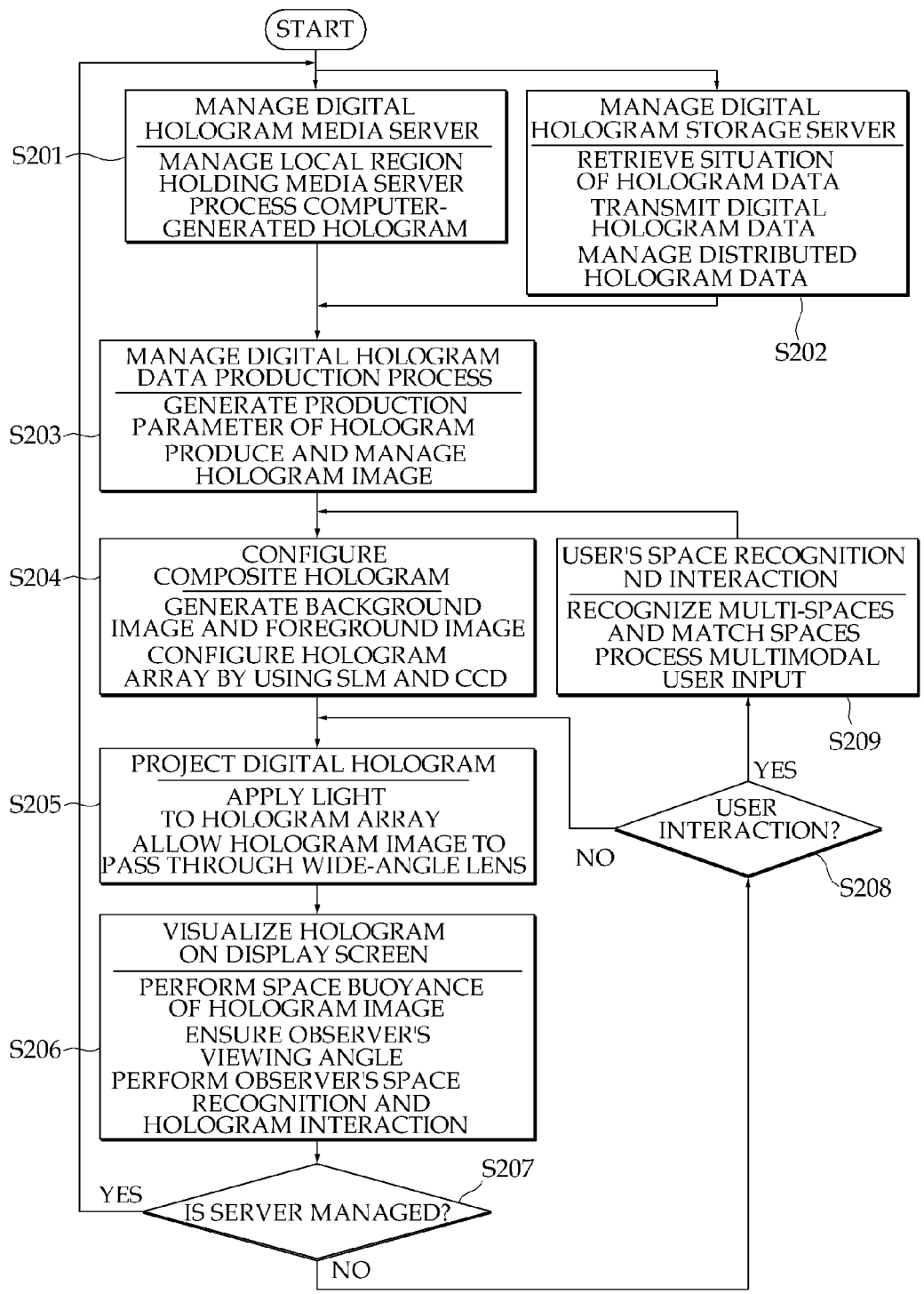
FIG. 2 is a flowchart illustrating a procedure of displaying a digital hologram based on a projection according to an exemplary embodiment of the present disclosure.

FIG. 2 is a flowchart illustrating a procedure of displaying a digital hologram based on a projection according to an exemplary embodiment of the present disclosure.

In a processing sequence diagram of FIG. 2, the hologram image is visualized on the hologram display screen in the digital hologram display system 100 and thereafter, a server management state of a subsequent step may be moved. Meanwhile, when an action for user's interaction occurs in space buoyance of the hologram image data, user's recognition of multi-spaces and space matching are performed through user's recognition of the space and interaction management, and further, user's multimodal interface is processed.

In more detail, first, the hologram content management system 110 serving as digital hologram media server management (S201) manages a media server positioned in a local region and processes a computer-generated hologram. The hologram content management system 110 serving as digital hologram storage server management (S202) retrieves a situation of the hologram data, transmits the digital hologram data, and distributively manages the mass hologram data.

Next, the hologram content management system 110 serving as digital hologram data production process management (S203) generates the production parameter of the digital hologram, and produces and manages the hologram image.

Next, the digital hologram display system 100 serving as composite hologram configuration (S204) generates the background image and the foreground image through the composite hologram unit 103 as described above, and configures the hologram array by using the SLM and the CCD.

Thereafter, the digital hologram display system 100 serving as digital hologram projection (S205) applies the light from a point light source to the hologram array through the hologram projection unit 101 and allows the hologram image to pass through the wide-angle lens.

Lastly, the hologram image is visualized on the hologram display screen through the hologram display unit 102 (S206). That is, the hologram image is subjected to space buoyance, the viewing angle of the observer is ensured, and the observer's space recognition and hologram interaction function.

Thereafter, when the server is continuously managed (S207), steps S201 to S203 are performed in the hologram content management system 110 again and subsequently, steps S204 to S206 in the digital hologram display system 100 are repeatedly performed.

If there is user interaction (S208), the digital hologram display system 100 performs a user's space recognition and interaction management (S209) function. That is, space matching is performed by recognizing the multi-spaces and multimodal user's input processing is performed, and thereafter, the process proceeds to step S204.

When there is no user interaction, the digital hologram projection of step S205 is continued.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A system of displaying a digital hologram based on a projection, comprising:
   a composite hologram unit configured to receive hologram data including a fringe pattern, generate a foreground image and a background image, generate a hologram array by arrangement of a charge coupled device and a spatial light modulator of a digital camera and by compositing the generated foreground image and the generated background image with the received hologram data including the fringe pattern;
   a hologram projection unit configured to apply a light from a point light source to the hologram array and project the hologram image created by the hologram array through a lens using the light irradiating the hologram array; and
   a hologram display unit configured to perform space buoyance of the hologram image projected by the hologram projection unit on a 3D hologram display screen.

2. The system of claim 1, wherein:
   the hologram display unit performs space buoyance of the hologram image projected on the 3D hologram display screen by using a spherical mirror.

3. The system of claim 1, wherein:
   the hologram display unit processes a user's multimodal interface in space buoyance of the hologram image on the 3D hologram display screen, and performs space matching and user interaction by recognizing user's multi-spaces.

4. The system of claim 1, wherein:

the digital hologram display system performs at least one of hologram data production process management, regional information management, and distributive storage and management of the hologram data, and interworks with a hologram content management system configured to manage mass hologram data.

5. The system of claim 4, wherein:

the hologram content management system converts the hologram data by considering information suitable for a local region situation, and provides the converted hologram data as hologram data specialized to a local region.

6. A method of displaying a digital hologram based on a projection, comprising:

receiving, by a composite hologram unit, hologram data including a fringe pattern, generating a foreground image and a background image, generating a hologram array by arrangement of a charge coupled device and a spatial light modulator of a digital camera and by compositing the generated foreground image and the generated background image with the received hologram data including the fringe pattern;

applying, by a hologram projection unit, a light from a point source light to the hologram array;

projecting, by the hologram projection unit, the hologram image through a wide-angle lens using the light irradiating the hologram array; and performing, by a hologram display unit, space buoyance of the hologram image projected by the hologram projection unit on a 3D hologram display screen.

7. The method of claim 6, wherein:

in the performing of space buoyance, the hologram image is subjected to space buoyance on the 3D hologram display screen by using a spherical mirror.

8. The method of claim 6, further comprising:

processing, the hologram display unit, a user's multimodal interface in space buoyance of the hologram image on the 3D hologram display screen, and performing space matching and user interaction by recognizing user's multi-spaces.

9. The method of claim 6, further comprising:

performing, by a hologram content management system configured to manage mass hologram data, at least one of hologram data production process management, local information management, and distributive storage and management of the hologram data, after the performing of the space buoyance.

10. The method of claim 9, wherein:

the hologram content management system converts the hologram data by considering information suitable for a local region situation, and provides the converted hologram data as hologram data specialized to a local region.

* * * * *